Dec. 21, 1948.  T. P. SIMPSON ET AL  2,457,093
APPARATUS FOR CONVERSION OF HYDROCARBONS
Filed Aug. 3, 1943  2 Sheets-Sheet 1
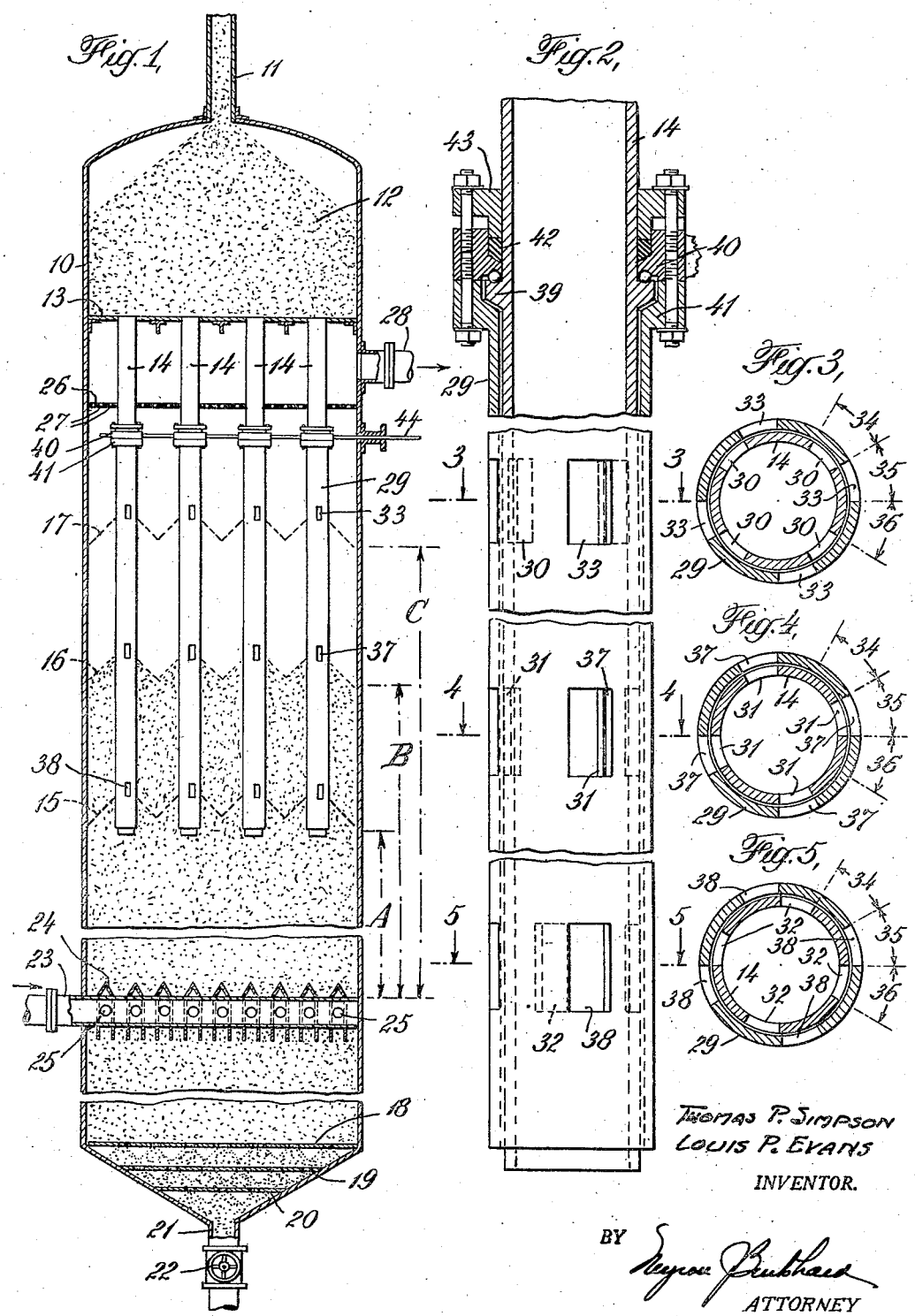
Thomas P. Simpson
Louis P. Evans
INVENTOR.
BY
ATTORNEY Dec. 21, 1948.   T. P. SIMPSON ET AL   2,457,093
APPARATUS FOR CONVERSION OF HYDROCARBONS
Filed Aug. 3, 1943   2 Sheets-Sheet 2
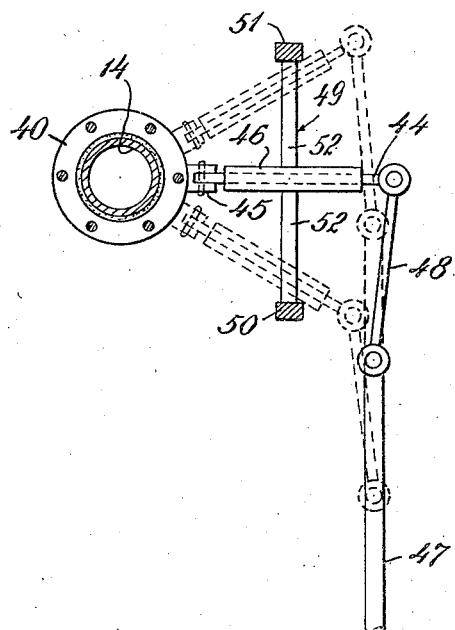
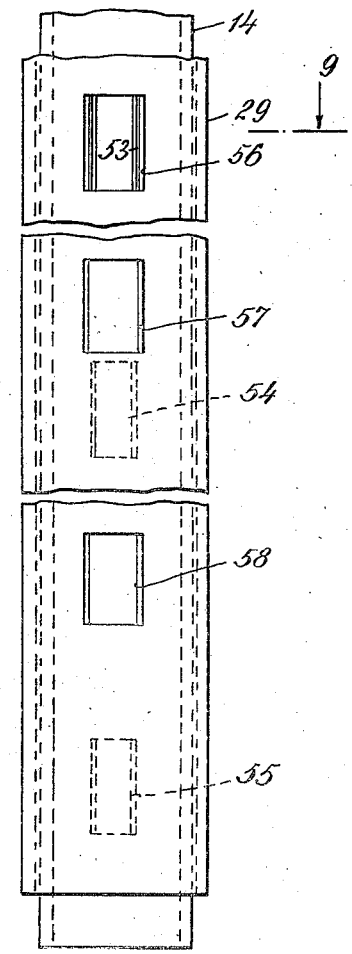
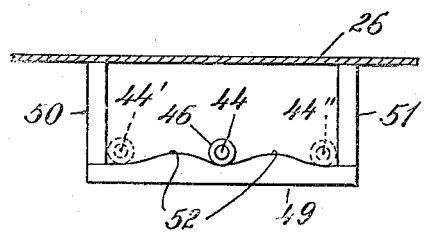
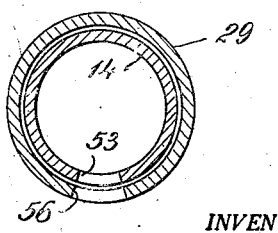
INVENTORS
THOMAS P. SIMPSON
LOUIS P. EVANS
BY
ATTORNEY Patented Dec. 21, 1948

2,457,093

UNITED STATES PATENT OFFICE 2,457,093

APPARATUS FOR CONVERSION OF HYDROCARBONS

Thomas P. Simpson and Louis P. Evans, Woodbury, N. J., assignors to Socony-Vacuum Oil Company, Incorporated, a corporation of New York Application August 3, 1943, Serial No. 497,178

5 Claims. (Cl. 23—288)

This invention has to do with apparatus for the conversion of hydrocarbons in the presence of a particle form solid contact mass material. As is well known, the conversion of hydrocarbons can be effected by passing hydrocarbon vapors at elevated temperatures into contact with particle form solid adsorptive contact mass materials, for example, a petroleum gas oil boiling substantially between 550° F. and about 750° F. when passed at a temperature of 800° F and upwards, usually around 850° F. and in contact with a material of this kind may be converted to the extent of about 40% or more to materials in the gasoline boiling range. The contact mass used is utilized in the form of a granule, particle or pellet and may be made either of natural or altered clay materials such as fullers' earth, "Super-Filtrol," acid treated clays and the like or may be made of the other natural or synthetic forms of silica, alumina or various associations of the same with or without added materials adopted for some special purpose in the desired hydrocarbon conversion. These materials, all of adsorptive nature, are generally considered as being included under the terminology "clay type catalyst." In more recent developments of the art of bringing hydrocarbons into contact with such materials, the contact mass material, utilized in the form of granules or pellets of substantial size, such as pellets of 2½ mm. diameter by 2½ mm. length or even larger, is passed cyclically through two zones. In the first zone, the contact mass is contacted with hydrocarbons and the desired reaction occurs, accompanied by the usual deposit of a cokey, carbonaceous, combustible residue upon the contact mass. Passing to the second zone, the contact mass material is regenerated by burning off the deposit, after which the clean contact mass material is returned to the reaction zone. This invention has to do particularly with reactors for use in processes of this nature.

In the control of reactions of this kind, there are several variables which must be given attention. An important variable of this nature is space velocity, that is, the volume of oil (usually measured upon a liquid basis) which is passed through a unit volume of catalyst in a unit of time. For some reactions, a relatively high space velocity is required. For other reactions, a relatively low space velocity is required. Since heaters, fractionating equipment and the like usually operate best at a relatively uniform loading, it is frequently desirable to accomplish variations in space velocity, where required, by holding the oil thruput rate constant and varying the volume of contact mass material through which the reactants are passed. For example, in a reactor of a given cross section, assuming that it is handling reactants at a space velocity of 1, when they pass longitudinally broadcast from top to bottom of a contact mass bed 10' deep, the space velocity may be doubled by reducing the height of the bed to 5'. This invention has to do with a reactor so equipped that beds of variable depths may be established and maintained in that reactor during a continuous operation. Since any one operation will utilize a bed of a particular depth for some period of time, the arrangements to vary the depth of bed need be suitable only for being changed at such intervals as it becomes necessary to change from one style of operation to another, however, it is desirable to be able to effect these changes in bed depth without opening, entering, or re-fitting of the reactor.

It is therefore a major object of this invention to provide a reactor in which adjustments may be made so that any one of several depths of bed may be provided without intervening refitting of or entry to the interior of the reactor.

This invention may be readily understood by reference to the drawings attached hereto, all of which are in diagram form, and which show a form of apparatus embodying this invention. In these drawings, Figure I is a partial view of the interior of a reactor, fitted in accordance with this invention. Figure II is an enlarged view of a detail thereof. Figures III, IV and V are sectional views taken at various levels in Figure II. Figure VI is a plan view of an apparatus detail in connection with Figure II. Figure VII is a view of a detail utilized in Figure VI. Figure VIII is a view of an optional device and Figure IX is a sectional view of the device of Figure VIII.

Turning to Figure I, we find that 10 is the shell of a reactor to which contact mass material is fed by pipe 11, collecting in a storage space 12 defined by partition 13. Dependent from partition 13 into the body of the reactor are several contact mass feed pipes 14. Contact mass material flows downwardly through these feed pipes and may be discharged at any one of several levels, three being shown for clarity, and when so discharged will fill the reactor up to a level associated with the discharge points such as level 15, or 16, or 17. Flow of the contact mass material through the reactor is caused to be uniform across the cross section of the reactor by a series of baffles 18, 19, 20 near the bottom of the reactor, which baffles have orifices in them, which orifices are so arranged as to withdraw contact mass material uniformly in a plurality of small streams from orifices evenly distributed with respect to the cross sectional area of the reactor and which successively re-combine those small streams into a single outlet stream flowing through pipe 21. The degree of opening of valve 22 is adjusted in accordance with the rate of flow through pipe 11 so that when once filled to a desired level within the reactor, flow rates of contact mass are such as to retain that level. Near the bottom of the reactor there is a reactant handling grid composed of pipe 23 mounted transversely of the reactor with which there are associated several gable roofed, open bottomed, trough members 24, which extend transversely of the reactor in a direction perpendicular to the plane of the drawing. Under each trough 24, there is an orifice 25, establishing communication between the interior of pipe 23 and the space under trough 24. Near the top of the reactor, there is a plate 26, fitted with orifices 27. The pipes 14 extend downwardly through this plate 26. Between plate 26 and plate 13, there is thus established another reactant handling chamber which communicates with outside fluid handling systems through pipe 28. If 23 be used as a reactant inlet, reactants will flow into 23 out through orifice 25 into the space under troughs 24, thence out into the contact mass material, upwardly through the contact mass material then through orifices 27 in plate 26 and leave the reactor through pipe 28. If the reactor is filled with contact mass only to level 15, then reaction takes place in a bed of depth "A." If level 16 is utilized, depth of bed is indicated by "B." If level 17 is utilized, the depth of bed is indicated by "C." The manner of varying this depth of bed will be more readily understood by reference to Figures II and V inclusive.

In Figure II, 14 represents one of the contact mass material feed pipes which is surrounded by a concentric sleeve valve pipe 29. This contact mass feed pipe is provided with a series of orifices 30, 31, 32, each angularly displaced from the other and arranged at appropriate levels within the reactor for establishment of the various levels. Orifices 30, corresponding to level 17, 31 to 16, and 32 to 15. For a better understanding of the arrangement of orifices and related matters, we may turn first to Figure III, which is a section taken at the level indicated by 3—3 in Figure II. In Figure III, we find contact mass feed pipe 14 to be provided with one or more orifices 30 and sleeve pipe 29 is provided with one or more orifices 33. From consideration of this section, it is obvious that when an orifice 33 is in a position indicated by the dimension arc 34, contact mass material may flow out into the reactor through orifices 30 but that when orifice 33 is in either of the positions indicated by arcs 35 and 36, the orifice 30 is closed. Similarly, in Figure IV, taken at the level 4—4, we have pipe 14 provided with one or more orifices 31 and the sleeve pipe 29 is provided with a similar number of orifices 37. If now these orifices 37 in sleeve pipe 29 be in line with orifices 33, in sleeve pipe 29, then when the sleeve pipe is in position 35, orifices 31 are opened and orifices 30 above them are closed. Similarly, in section 5—5, we find a series of orifices 32 in feed pipe 14 and a series of orifices 38 in sleeve pipe 29. The arrangement again is such that when sleeve pipe 29 is in position 36, ports 32 are open and ports 31 and 30 are closed. Returning to Figure II, the device is shown with ports 31 and 37 in register, that is, with the sleeve pipe in the position designated as 35 in the three sections, ports 30, 33 and 38, 32 being closed. In this case the level of contact mass material in the reactor will be established by flow through ports 31. Still referring to Figure II, this rotating sleeve pipe may conveniently be supported by a support comprising a ball race in a shoulder 39 formed on the outside of pipe 14, the opposing member of which is a flange 40, bolted to a flange 41 formed upon the end of pipe 29. To protect this support from the entry of unwanted dust, a dust protective packing 42 may be held around pipe 14 by a proper gland member 43.

In order to provide for rotation of the sleeve pipe, any rather simple mechanism may be utilized such as that shown in Figure VI wherein is seen the structure at the top of sleeve pipe 29, designated by the numeral 40 which is provided with an outwardly extending arm 44, connected to and pivoted in relation to member 40 at 45 and equipped with a roller sleeve 46. This member 44 may be moved through an arc necessary to handle the openings provided by a reciprocating rod 47 which is operated from outside the reaction chamber, which may conveniently be connected to arm 44 by some link 48 in order to provide for rectilinear motion of 47 through any appropriate packing device. In order to provide for the proper positioning of the sleeve pipe, a three position guide may be utilized. One very simple and convenient form which may be adopted is that shown in Figure VII, wherein there is shown a U shaped guide member 49, which is affixed to the underside of that plate designated 26 in Figure I. The vertical supporting members 50 and 51 at either end, serve as limit stops for the two extreme positions for rod 44, as indicated by the drawing items 44' and 44". In order to effect accurate placement of the midpoint, the bottom member of 49 may be formed as a simple cam as at 52, to provide a center rest position 44''' for intermediate placement of arm 44. Returning to Figure VII, the plan relationship of items 51, 50, and the cam surface 52 may be seen and it may be seen why 44 is fitted with a sleeve 46 in order to provide for a more or less rolling motion of 44 along this cam. Obviously, many other devices suitable to give a controlled angular motion of sleeve pipe 29 around pipe 14 may be used, such as for example, a housed worm gear arrangement, or any other suitable mechanism, the principal criterion being to select a mechanism capable of relative freedom from derangement by the particles of catalyst dust present in the atmosphere within the reactor.

Alternately a vertically sliding sleeve valve arrangement might be used such as that shown in Figures VIII and IX, wherein IX is a section taken at the indicated level in VIII. In Figure VIII, we have contact mass feed pipe 14, fitted again with a series of orifices at various levels such as 53, 54 and 55. In sleeve valve 14, there is another series of orifices 56, 57, and 58. The two series of orifices being so arranged that when one orifice in the sleeve pipe 29 is in register with its corresponding orifice in feed pipe 14, the other orifices in the top pipes are not in register. As before, any suitable mechanism may be utilized for securing motion of sleeve pipe 29 with respect to feed pipe 14.

Returning now to Figure I, there is shown in that figure a very highly diagrammatic form of the feed pipe mechanism developed in Figure II, showing how outlets may be provided at several levels within reactor 10 to provide contact mass beds of varying depths as desired.

With this structure there is provided a reactor wherein beds of various depths may be provided for various reactive purposes, without the necessity of entry to the reactor for changeover purposes.

It will be understood that the detailed design presented herein is for purposes of exemplification and explanation, that there are equivalent arrangements, and that the invention is not limited to or by the details here presented, but subject only to those limitations expressed in the following claims.

We claim:

1. In a reactor for converting fluid reactants in the presence of a moving particle-form solid contact mass material, means defining a vertical reaction chamber, means to introduce fluid reactants thereinto located near one end thereof, means to remove reaction products located near the opposite end of the reaction chamber, a contact mass feed hopper located above said reaction chamber, at least one fixed contact mass feed pipe extending from said feed hopper into said reaction chamber, a plurality of orifices distributed along the length of said feed pipe and at different levels in said reaction chamber, orifice selecting means whereby orifices at one level may be held open while orifices at other levels are held closed to permit discharge of the contact mass into the reaction chamber at any selected level, means to remove contact mass from the bottom or the reaction chamber, and control means thereover which may be adjusted in relation to the rate of contact mass feed to maintain the reaction chamber substantially filled with contact mass up to the selected level of contact mass feed.

2. The apparatus of claim 1 in which the contact mass feed pipe is equipped with orifices at a plurality of points along its length and the orifice selecting means is a sliding sleeve concentric with said feed pipe and equipped with corresponding orifices so located that when orifices in pipe and sleeve at one level are in register, the orifices in pipe and sleeve at other levels are not in register.

3. The apparatus of claim 1 in which the contact mass feed pipe is equipped with orifices at a plurality of points along its length and the orifice selecting means is a rotating sleeve concentric with said feed pipe and equipped with corresponding orifices so located that when orifices in pipe and sleeve at one level are in register, the orifices in pipe and sleeve at other levels are not in register.

4. In a reactor for converting fluid reactants in the presence of a moving particle-form solid contact mass material, means defining a vertical reaction chamber, means to introduce fluid reactants thereinto located near one end thereof, means to remove reaction products located near the opposite end of the reaction chamber, a contact mass feed hopper located above said reaction chamber, at least one immovable contact mass feed pipe extending from said feed hopper into said reaction chamber, a plurality of orifices distributed along the length of said feed pipe and at different levels in said reaction chamber, orifice selecting means whereby orifices at one level may be held open while orifices at other levels are held closed to permit discharge of the contact mass into the reaction chamber at any selected level, means whereby said orifice selecting means may be operated from a point external to said reaction chamber, means to remove contact mass from the bottom of the reaction chamber, and control means thereon which may be adjusted in relation to the rate of contact mass feed to maintain the reaction chamber substantially filled with contact mass up to the selected level of contact mass feed.

5. An apparatus for converting fluid reactants in the presence of a particle-form solid contact mass material which comprises: means defining a substantially vertical reaction chamber, means to introduce fluid reactants near one end of said chamber, means to withdraw reaction products from said chamber near the opposite end thereof, at least one fixed contact mass feed pipe extending substantially vertically downwardly into said chamber and terminating in the lower section thereof, a plurality of orifices distributed at different levels along the length of said feed pipe in said chamber, a movable sleeve concentric with said feed pipe having thereon corresponding orifices to those in said fixed feed pipe so located that on movement of the sleeve orifices in the pipe and sleeve at one level are brought into register and the orifices in the pipe and sleeve at other levels are moved out of register, means extending to a point external of the reaction chamber and connected to the movable sleeve for moving the same, means to withdraw contact material from the bottom of said chamber and flow throttling means associated with said contact material withdrawal means.

THOMAS P. SIMPSON.
LOUIS P. EVANS.

REFERENCES CITED

The following references are of record in the file of this patent:

UNITED STATES PATENTS

| Number | Name | Date |
|---|---|---|
| 669,411 | Guiterman | Mar. 5, 1901 |
| 1,102,714 | Bornmann | July 7, 1914 |
| 2,274,003 | Sheppard | Feb. 24, 1942 |
| 2,298,593 | Rubin et al. | Oct. 13, 1942 |

FOREIGN PATENTS

| Number | Country | Date |
|---|---|---|
| 383,616 | Great Britain | [1] |

[1] (Complete not accepted.)
Convention date (France) Feb. 2, 1930.

Certificate of Correction

Patent No. 2,457,093.  December 21, 1948.

THOMAS P. SIMPSON ET AL.

It is hereby certified that errors appear in the printed specification of the above numbered patent requiring correction as follows:

Column 4, line 68, for the words "top pipes" read *two pipes*; column 5, line 34, claim 1, for "bottom or" read *bottom of*;

and that the said Letters Patent should be read with these corrections therein that the same may conform to the record of the case in the Patent Office.

Signed and sealed this 26th day of April, A. D. 1949.

[SEAL]

THOMAS F. MURPHY,
*Assistant Commissioner of Patents.*